United States Patent
Pottenger

(10) Patent No.: US 8,239,492 B2
(45) Date of Patent: Aug. 7, 2012

(54) SYSTEM FOR CONTENT-BASED PEER-TO-PEER INDEXING OF DATA ON A NETWORKED STORAGE DEVICE

(76) Inventor: William M. Pottenger, Hellertown, PA (US)

( * ) Notice: Subject to any disclaimer, the term of this patent is extended or adjusted under 35 U.S.C. 154(b) by 413 days.

(21) Appl. No.: 12/317,153

(22) Filed: Dec. 19, 2008

(65) Prior Publication Data

US 2009/0177757 A1 Jul. 9, 2009

Related U.S. Application Data

(60) Provisional application No. 61/008,404, filed on Dec. 20, 2007.

(51) Int. Cl.
*G06F 15/16* (2006.01)
(52) U.S. Cl. ......... 709/219; 709/221; 709/223; 711/165
(58) Field of Classification Search .................. 709/219
See application file for complete search history.

(56) References Cited

U.S. PATENT DOCUMENTS

| | | | |
|---|---|---|---|
| 6,901,398 B1 | 5/2005 | Horvitz et al. | |
| 7,117,437 B2 | 10/2006 | Chen et al. | |
| 7,174,382 B2 | 2/2007 | Ramanathan et al. | |
| 7,328,216 B2 | 2/2008 | Hofmann et al. | |
| 7,337,181 B2 * | 2/2008 | Horvitz ............................... | 1/1 |
| 7,392,303 B2 | 6/2008 | Smith et al. | |
| 7,617,370 B2 * | 11/2009 | Jernigan et al. ............... | 711/165 |
| 7,634,466 B2 | 12/2009 | Rose et al. | |
| 7,664,742 B2 | 2/2010 | Pettovello | |
| 7,769,804 B2 | 8/2010 | Church et al. | |
| 2002/0069056 A1 | 6/2002 | Nofsinger | |
| 2002/0078062 A1 * | 6/2002 | Kataoka et al. ............... | 707/101 |
| 2003/0191828 A1 | 10/2003 | Ramanathan et al. | |
| 2003/0236861 A1 * | 12/2003 | Johnson et al. ............... | 709/219 |
| 2004/0024848 A1 * | 2/2004 | Smith et al. .................... | 709/219 |
| 2006/0282309 A1 | 12/2006 | Zhang et al. | |
| 2007/0168469 A1 * | 7/2007 | Church et al. ................ | 709/219 |
| 2007/0211651 A1 | 9/2007 | Ahmed et al. | |
| 2008/0080393 A1 | 4/2008 | Kaler | |
| 2009/0125637 A1 | 5/2009 | Matuszewski | |
| 2009/0164475 A1 | 6/2009 | Pottenger | |

(Continued)

OTHER PUBLICATIONS

Official Action issued in connection with U.S. Appl. No. 12/317,134 mailed Oct. 7, 2010.

(Continued)

*Primary Examiner* — Firmin Backer
*Assistant Examiner* — Keyvan Emdadi
(74) *Attorney, Agent, or Firm* — Beverly W. Lubit; Greenberg Traurig, LLP

(57) ABSTRACT

An apparatus consisting of a networked data storage device and a software system for automatically indexing the data on the storage device by topic, and for sharing both the data and the topic indexes on the network. These may be used to provide the user of the apparatus with functionality including, but not limited to, content-based searching, sharing and automatic recommendations. The storage device stores its data by means of a file system. The indexing portion of the software performs topic-based categorization by means of a higher-order path analysis algorithm, which mimics human intuition by considering both high- and low-order links between data elements. The indexes generated by the software arc automatically partitioned by topic. The indexing software operates continuously and transparently, updating the index as data is added to or removed from the storage device.

13 Claims, 7 Drawing Sheets

U.S. PATENT DOCUMENTS

2009/0177728 A1  7/2009  Pottenger

OTHER PUBLICATIONS

Official Action issued in connection with U.S. Appl. No. 12/317,134 mailed Apr. 13, 2010.
"Vimeo" by Internet Archive WayBackMachine, dated from Jun. 2, 2007, pp. 1-6.
Official Action issued in connection with U.S. Appl. No. 12/317,152 mailed Jun. 22, 2011.
Official Action issued in connection with U.S. Appl. No. 12/317,134 mailed Jun. 28, 2011.
Official Action issued in connection with U.S. Appl. No. 12/317,152 mailed Dec. 21, 2010.
Taskar, B. et al, "Discriminative Probabilistic Models for Relational Data", In Proceedings of Uncertainty in Artificial Intelligence Conference UAI02, Edmonton, Canada, 2002.
Getoor, L. et al., "Link Mining: A Survey", SIGKDD Explorations, vol. 7, No. 2, 2005, pp. 3-12.
MacSkassy, S.A. et al., A Brief Survey of Machine Learning Methods for Classification in Networked Data and Application to Suspicion Scoring, Workshop on Statistical Network Analysis at 23rd International Conference on Machine Learning, Pittsburgh, Pa., 2006.
Angelova, R. et al., "Graph-based Text Classification: Learn From Your Neighbors", SIGIR '06, Aug. 2006, Seattle, USA, pp. 485-492.
Chakrabarti, S. et al., "Enhanced Hypertext Classification Using Hyper-Links", In Proceedings of ACM SIGMOD Conference, 1998, pp. 307-318.
Neville, J. et al., "Iterative Classification in Relational Data", In Proc. AAAI-2000 Workshop on Learning Statistical Models from Relational Data, 2000, pp. 42-49.
Taskar, B. et al., "Probabilistic Classification and Clustering in Relational Data", In Proc. 17th Internabonal Joint Conference on Artificial Intelligence, 2001, pp. 870-878, 2001.
Lu, Q. et al., "Link-based Classification", Proceedings of the Twentieth international conference on machine learning (ICML-2003), Washington D.C., 2003, pp. 496-503.
Neville, J. et al., "Dependency Networks for Relational Data", Proceedings of the Fourth IEEE International Conference on Data Mining (ICDM'04), Nov. 2004, pp. 170-177, Brighton, UK.
Rennie, J.D.M. et al., "Tackling the poor assumptions of naive bayes text classifiers", In Proceedings of the Twentieth International Conference on Machine Learning, 2003.
McCallum, A.K. et al., "A comparison of event models for naive bayes text classification", In Working Notes of the ICMLAAAI Workshop on Learning for Text Categorization, 1998.
Eyheramendy, S. et al., "On the naive Bayes model for text categorization" In Proceedings of AISTATS 2003, 9th International Workshop on Artificial Intelligence and Statistics, 2003.
Kontostathis, A. et al., "A Framework for Understanding LSI Performance", Information Processing & Management, vol. 42, No. 1, 2006, pp. 56-73.
Deerwester, S. et al., "Indexing by latent semantic analysis", Journal of the American Society for Information Science, vol. 41, No. 6, 1990, pp. 391-407.
Ganiz, M. et al., "Link Analysis of Higher-Order Paths in Supervised Learning Datasets", In the Proceedings of the Workshop on Link Analysis, Counterterrorism and Security, 2006 SIAM Conference on Data Mining, Bethesda, Md., Apr. 2006.
Ganiz, M. et al., "Detection of Interdomain Routing Anomalies Based on Higher-Order Path Analysis", Proceedings of the Sixth IEEE International Conference on Data Mining (ICDM'06), Dec. 2006, Hong Kong, China.
Edmonds, P., "Choosing the word most typical in context using a lexical co-occurrence network", In Proceedings of the Thirty-fifth Annual Meeting of the Association for Computational Linguistics, 1997, pp. 507-509.
Zhang, X. et al., "Level search schemes for information filtering and retrieval", Information Processing and Management, vol. 37, No. 2, 2000, pp. 313-334.
Schutze, H., "Automatic Word Sense Discrimination", Computational Linguistics, vol. 24, No. 1, 1998, pp. 97-124.
Xu, J. et al., "Corpus-Based Stemming Using Co-Occurrence of Word Variants", ACM Transactions on Information Systems, vol. 16, No. 1, 1998, pp. 61-81.
Uno, T., "An Output Linear Time Algorithm for Enumerating Chordless Cycles", 92nd SIGAL of Information Processing Society Japan, 2003, pp. 47-53.
Uno, T., "Algorithms for Enumerating All Perfect, Maximum and Maximal Matchings in Bipartite Graphs", Lecture Notes in Computer Science, vol. 1350. Proceedings of the 8th International Symposium on Algorithms and Computation, 1997, pp. 92-101, ISBN: 3-540-63890-3, Springer-Verlag, London, UK.
McCallum, A.K. et al., "Automating the construction of internet portals with machine learning", Information Retrieval, vol. 3, 2000, pp. 127-163.
Giles, C.L. et al., "CiteSeer: An automatic citation indexing system", ACM Digital Libraries 98, 1998, Third ACM Conference on Digital Libraries, Ed. Witten, I. et al., ACM Press, New York, pp. 89-98.
Sen, P. et al., "Link-based Classification", University of Maryland Technical Report, No. CS-TR-4858, Feb. 2007.
Sarawagi, S. et al., "Cross-Training: Learning Probabilistic Mappings Between Topics", SIGKDD '03, 2003, Washington, DC, USA.
Official Action from the United States Patent and Trademark Office for U.S. Appl. No. 12/317,152 dated Nov. 10, 2011.

* cited by examiner

High-Level Logical Diagram

Physical Diagram of Preferred Embodiment

Software Stack Diagram

Layer Structure of IxP2P Components Within System Context

Indexing Module Diagram

P2P Module Diagram

Flowchart of Indexing Operation

Example of extracting/enumerating higher-order paths from a co-occurrence graph

SYSTEM FOR CONTENT-BASED PEER-TO-PEER INDEXING OF DATA ON A NETWORKED STORAGE DEVICE

CROSS-REFERENCE TO RELATED APPLICATIONS

This application claims the benefit of provisional patent application Ser. No. 61/008,404, filed 2007 Dec. 20 by the present inventor.

The technology described in this patent forms a key component of other patent pending technologies, including filed applications "Peer-to-Peer Indexing-based Marketplace", and "Social Networking on a Website with Topic-Based Data Sharing", filed by Intuidex Inc.

BACKGROUND AND FIELD OF THE INVENTION

This application relates to the field of digital data storage and techniques for providing searching and sharing access to that data, including access through a network.

BACKGROUND OF THE INVENTION

Prior Art

Prior art in the field consists of networked data storage devices that share data by means of a peer-to-peer protocol. These inventions allow automatic sharing of files on the device across a network, and possibly searching for shared files by the filename or file metadata.

This invention exceeds the capabilities of the prior art primarily by means of higher-order indexing algorithms and the customization of the peer-to-peer network, which provide for sharing of not only the content but also the indexes generated with higher-order methods, whereby is provided a way of searching and sharing data that is more intuitive to human users of the invention.

DRAWINGS

1. Logical module diagram, showing the software and hardware modules at a high level
2. Physical diagram of preferred embodiment
3. Software "stack" diagram (Siemens Layer Diagram)
4. Indexing software module diagram
5. Peer-to-peer software module diagram
6. Flowchart of writing data to disk, indexing, and sharing
7. Example of extracting/enumerating higher-order paths from a co-occurrence graph

SUMMARY OF THE INVENTION

The invention consists of a data storage device, a file system for organizing data on the device, a software module providing indexing and search functions for the data on the device, software for communicating with other devices using a peer-to-peer data exchange protocol, software for performing automated backups to the device, and user interface software for controlling the functions of the system. An additional optional component is an HTTP server for providing a web-based user interface to any device on the network to which the invention is attached.

The peer-to-peer protocol is specifically designed to use the output of the indexing module to provide distributed indexes and distributed search. The peer-to-peer software also provides complete facilities for user-level and group-level authentication and security, including permissions based on the topics generated by the indexing software. All the software and hardware elements are integrated to allow the system to function as an independent sharing and indexing node on a communications network.

BRIEF DESCRIPTION OF THE DRAWINGS

Drawing 1 is a high-level logical diagram depicting the main functional modules of the system. This diagram does not describe the embodiment of any of these modules.

Drawing 2 is a physical diagram of the preferred embodiment of the system. The outermost box represents the physical housing of the unit. The primary external connectors for USB, Ethernet, and Power are shown on the right. Inside the housing, the disk drive is represented, as well as the Printed Circuit Board (PCB) on which reside a standard processing unit with RAM, and the ROM chips containing the system's software in embedded form.

Figure 1:
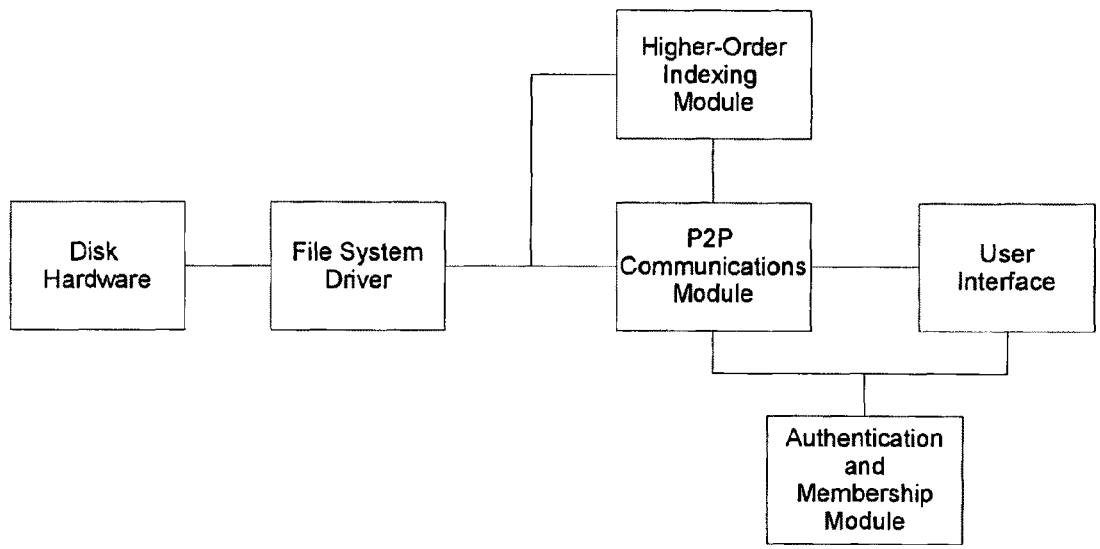
Figure 2:
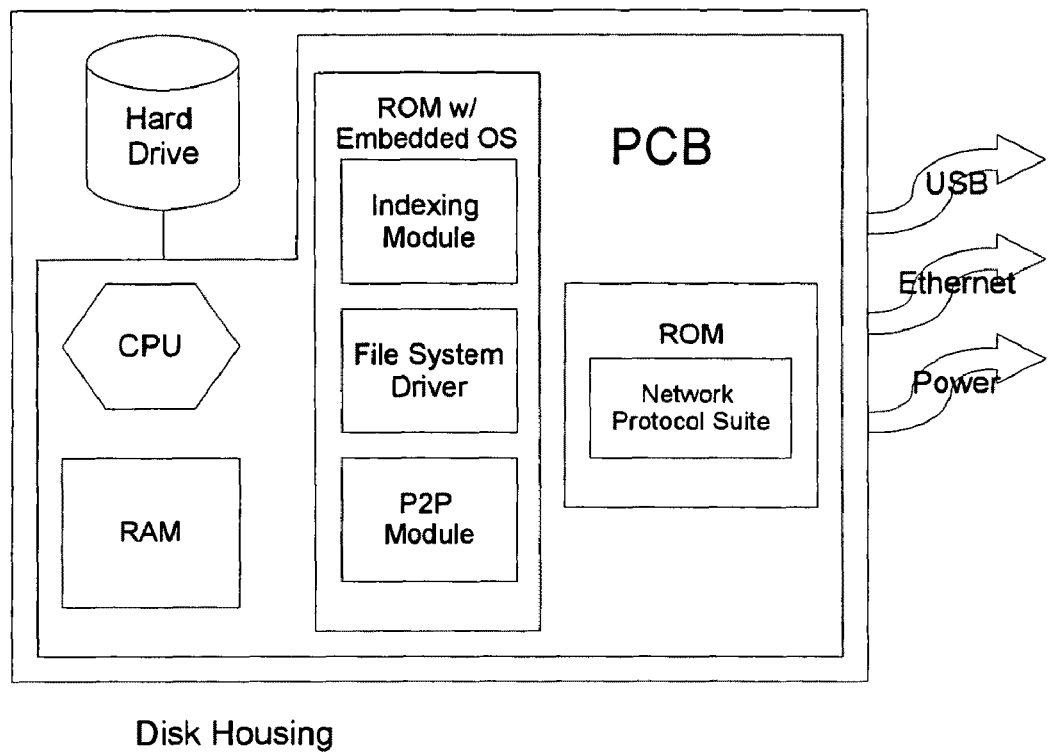
Figure 3:
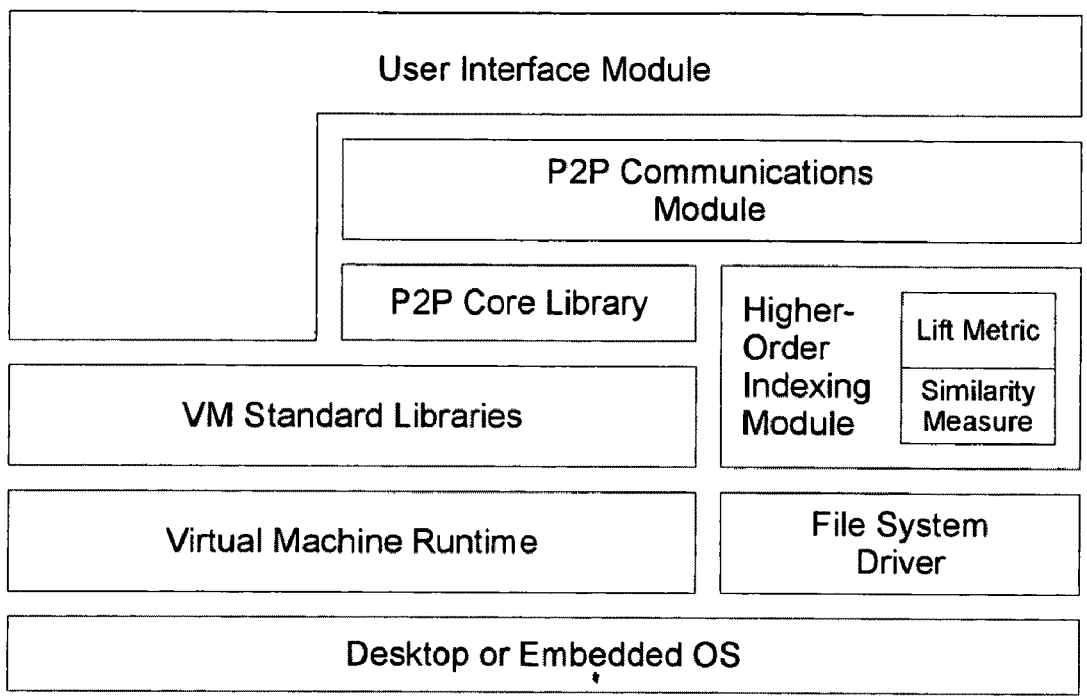
Figure 4:
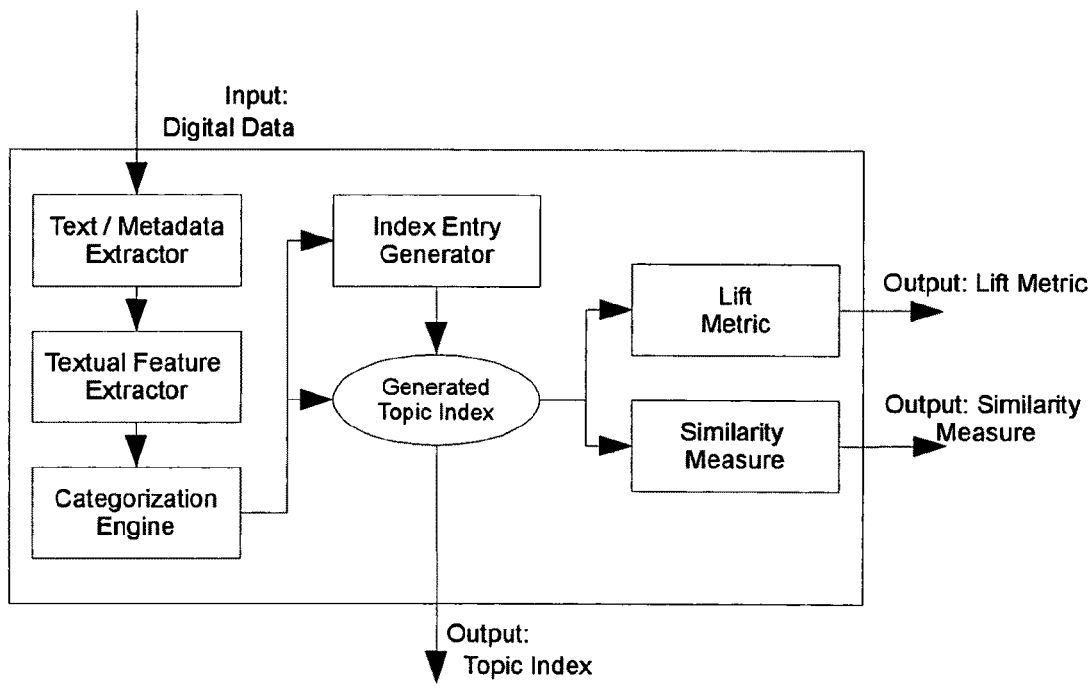
Figure 5:
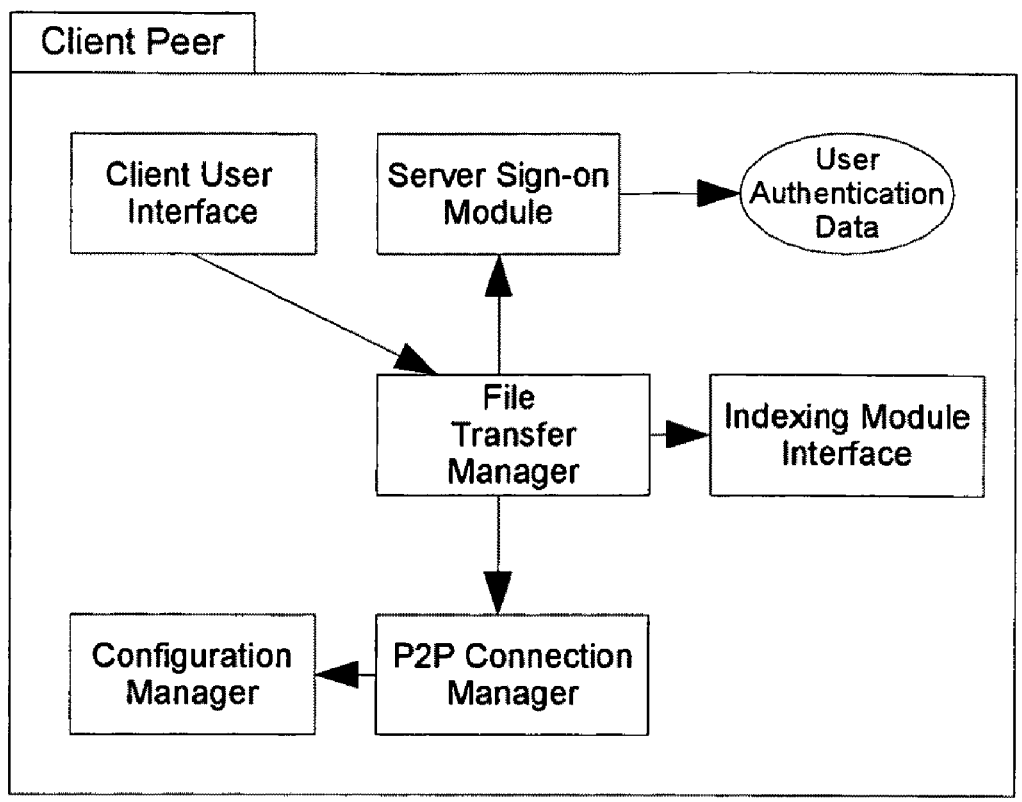
Figure 6:
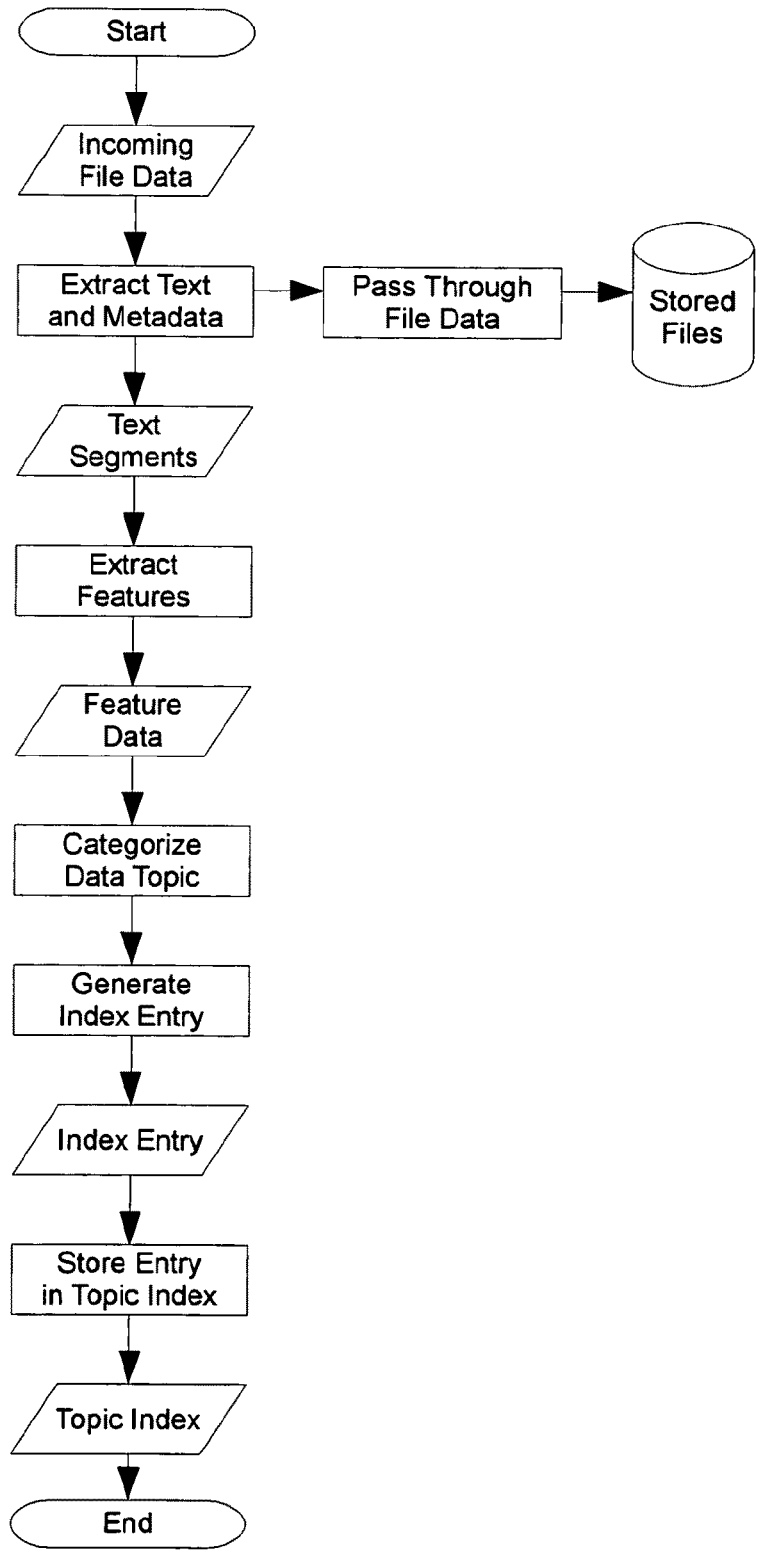
Figure 7:
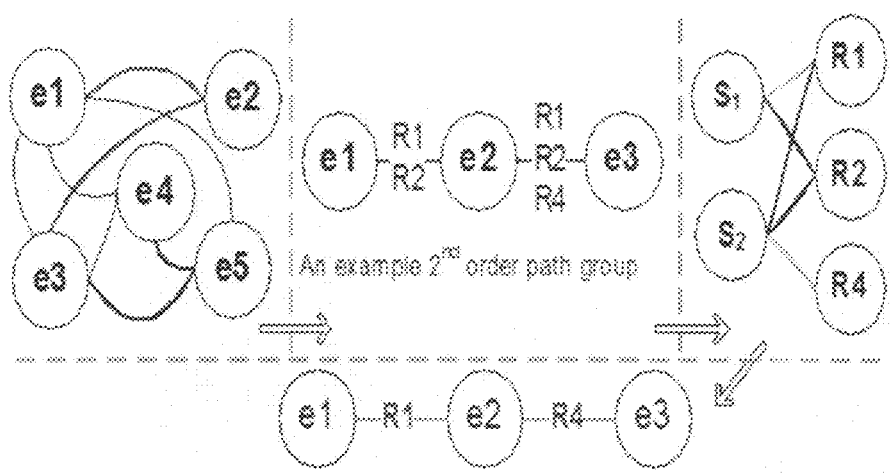

Drawing 3 is a layer vertically-oriented layer diagram showing the entire software stack employed by the system, from high- to low-level. This diagram provides an enumeration of all the software modules used in the system, as well as the major interfaces between them. Vertical adjacencies in this diagram correspond to allowable interfaces between the software components in the description. Each of these interfaces is described below in the detailed description of the preferred embodiment.

Drawings 4 and 5 show further decompositions of the two main software modules. Drawing 4 indicates the internal structure of the indexing software module, and Drawing 5 indicates the internal structure of the Peer-to-Peer software Module.

Drawing 6 is a flowchart showing the procedure for the operation of indexing new data.

Drawing 7 summarizes the process of extracting and enumerating higher-order paths from a co-occurrence graph.

DETAILED DESCRIPTION OF THE INVENTION

Preferred Embodiment

Following is a description of all the hardware and software components of the invention and how they interoperate. The novel implementations of the components, as well as the novel means of interconnection, provide an integrated functionality that is an improvement over the prior art in the domains of data search and sharing.

[001 Physical Embodiment Description]

The preferred embodiment of the invention is one in which the peer-to-peer and indexing software components reside on integrated circuits mounted to a printed circuit board within the housing containing the data storage device itself. In the preferred embodiment, the data storage device consists of a commonly available hard disk drive, and will be referred to from here on as the "hard drive". In this embodiment, a version of the user interface software is also implemented in the integrated circuits within the housing, though this embodiment also has the capability of interfacing with user interface software residing on external devices.

[002 Description of File System Module]

A file system is a specification of a method for storing, arranging, and retrieving data on a data storage device in the form of files and descriptive metadata accompanying those files. All modern file systems provide a hierarchical directory structure for organizing data on the storage device in the form of files. The invention contains a software component implementing a transaction-based file system for storing and retrieving data on the hard disk component. The nature of the transaction-based file system allows for multiple hosts to read and write to the hard disk simultaneously. This solves many problems related to sharing the contents of the hard disk on a network.

In addition, this file system provides group-level security through ACLs (Access Control Lists). This means that there can be fine-grained controls at the file system level over which users, by group, have access to each file and directory on the disk. Read, write, and execute permissions can be granted independently to different groups.

[003 Description of Indexing Software Module]

The function of the indexing module is to examine data files and create an index of those data files by topic. The topic should be an accurate classification of the contents of the data file within the range of a pre-existing set of topic categories. There are several methods for examining the data that is to be written to the disk. In one embodiment of the indexing software, files are examined for data in the form of plain text, and then that text is extracted and used to determine a topic using algorithms from the data mining field.

One such state-of-the-art classification method is implemented, which receives additional input from the system's user interface. Upon installation of the system, the system scans the data files that the user wishes to share, randomly selects a sample of the files, and prompts the user to input the correct topic of those files. This sample of user-labeled data is referred to in the field of statistical machine learning as the "training set." An algorithm known as the "training algorithm" uses the user-labeled data as its training set, and generates a second algorithm, called the "classification rule", for automatically classifying data that will be written to the disk in the future. The combination of training algorithm and classification rule make up our classification method. Typically they are not referred to independently, but as one Statistical Machine Learning algorithm.

The classification method used for this invention falls in the realm of Statistical Machine Learning algorithms, yet includes key advancements in the field. Statistical machine learning algorithms operate on flat data and traditionally assume that instances are independent and identically distributed (IID). However, this context-free approach does not exploit the available information about relationships between instances in the dataset [4]. In link mining, a subset of the field of statistical relational learning, algorithms operate on relational data that includes explicit links between instances. These relations provide rich information that can be used to improve classification accuracy of learned models, since attributes of linked instances are often correlated, and links are more likely to exist between instances that have some commonality. Given a set of test instances, relational models simultaneously label all instances in order to exploit the correlations between class labels of related instances. This is also known as collective classification (or collective inference), and violates the traditional independence assumption. Several studies (e.g., [5], [6], [7]) have shown, however, that by making inferences about multiple data instances simultaneously, collective inference can significantly reduce classification error [9].

The base classification algorithm used by the invention is the well-known Naïve Bayes algorithm. Naïve Bayes is commonly used in text classification because it executes quickly [10]. The Naïve Bayes classifier is the simplest of Bayesian classifiers in that it assumes that all attributes of the examples are independent of each other given the context of the class. Although this assumption does not hold for most real-world datasets, overall Naïve Bayes performs fairly well. Traditional (or first-order) Naïve Bayes uses documents as instances and words as the attributes. This maps directly to the method of our invention, in that the data files written to the hard disk are the documents, and the textual contents of those files, consisting either of words or of character n-grams, are the attributes.

To use the Naïve Bayes algorithm with a set of documents, first an ordered set of attributes (words or n-grams) is selected (commonly the union of all words found in a corpus of documents.) The documents are then used to create a set of training vectors, one vector for each document. The length of the vectors is equal to the size of the set of entities used in the classification process, and each coordinate t of the vector is either 1 or 0 indicating whether that word is present in the document. To each vector is appended its class C, representing the true class label of this document.

The training process for Naïve Bayes is at heart a probabilistic calculation using the well-known Bayes' rule. Based on the training vectors, the following set of empirical probabilities can be calculated:

$$P(t|C) = (\text{\# of documents in class } C \text{ including word } t)/(\text{\# of documents in class } C) \quad (1)$$

$$P(C) = (\text{\# of documents in class } C)/(\text{total \# of documents}) \quad (2)$$

The training algorithm consists entirely of computing these quantities from the given vectors. After these probabilities are calculated, Bayes' rule gives us a rule for calculating the probability that any future encountered document d belongs to class C:

$$P(C|d) = P(d|C)P(C) \quad (3)$$

So to classify any future document, this probability is calculated for all classes, and the label of the class whose probability is highest is selected as the correct label.

The training algorithm for this invention has been modified to include the higher-order relational information described above, overcoming the independence assumption. In our system, the higher-order information used is in the form of a second-order co-occurrence path.

Explicit links described above can take the form of words or n-grams in common between documents. For example, if two documents share the same term, those two documents have a first-order link to each other. If two documents both have a first-order link to a third document, but not to each other, then that is a second-order link, and so on. The highest order of links to be used in the training process is fixed beforehand. The preferred embodiment of this invention uses a second-order model.

In the higher-order algorithm, the form of the training set used is identical to that of traditional Naïve Bayes. However, a different set of empirical probabilities is calculated, as follows:

$$P\_(t|C) = (\text{\# of higher-order paths in class } C \text{ including word } t)/(\text{\# of higher-order paths in class } C) \quad (4)$$

$$P(C) = (\text{\# of higher-order paths in class } C)/(\text{total \# of higher-order paths})$$

The rest of the calculations and the inference process are the same as traditional (first-order) Naïve Bayes. Though the training algorithm considers higher-order information, after the training phase is complete the classification is still done with single data instances. In other words, after (4) and (5) are calculated from the training set, it is possible to compute (3)

with a single document in order to perform the classification. This is a significant advantage as it allows data files to be classified one-by-one, in real time, as they are written to the hard disk.

Computing the higher-order statistics used for the training process requires enumeration of all the second-order co-occurrence paths. This can be done using methods of graph theory. Our definition of a higher-order path is akin to that found in graph theory, which states that given a non-empty graph $G=(V, E)$ of the form $V=\{x_0, x_1, \ldots, x_k\}$, $E=\{x_0x_1, x_1x_2, \ldots, x_{k-1}x_k\}$ with nodes $x_i$ distinct, two vertices $x_i$ and $x_k$ are linked by a path P where the number of edges in P is its length. Such a path is often referred to by the natural sequence of its vertices $x_0x_1 \ldots x_k$. [6]. Our definition differs from this in a couple of respects, however. First, vertices $V=\{e_0, e_1, \ldots, e_k\}$ represent entities, and edges $E=\{r_0, r_1, \ldots, r_m\}$ represents records, documents or instances. Several edges may exist between given entities. Finally and most importantly, in a higher-order path both vertices and edges must be distinct.

Co-occurrence relations in a record or instance set can be represented as an undirected graph $G=(V, E)$ such that V is a finite set of vertices (i.e., entities) and E is the set of edges representing co-occurrence relations. In other words, if two entities co-oocur in a record then there is an edge between the corresponding vertices and this edge is labeled with the records(s) in which they co-occur. It is not straightforward, however, to depict higher-order paths with conventional graph structures because multiple paths may connect two given entities: for example, $e_1$-$r_1$-$e_2$ and $e_1$-$r_2$-$e_2$ are both valid paths between entities $e_1$ and $e_2$. A conventional graph can nonetheless be modified to represent paths of this nature by maintaining a data structure that contains lists of records for each edge. We term this a path group. Path groups are extracted directly from the co-occurrence graph G. Using this representation, the higher-order paths correspond to a complete matching in the bipartite graph formed from the set of entities and the set of lists of records. Likewise, higher-order paths defined in this manner are the system of distinct representatives of the sets of records for each edge.

Using the path group representation, we need to identify the systems of distinct representatives (SDRs) of the record sets. Each distinct representative in the path group satisfies the second requirement (i.e., edges must be unique) and corresponds to a higher order path. In order to enumerate all the distinct representatives in a given path group, a bipartite graph $G_b=(V_1 \cup V_2, E)$ is formed such that $V_1$ is the sets of records $(S_1, S_2, \ldots)$ in a given path group and $V_2$ is the records themselves. A maximum matching with cardinality $|V_1|$ in this bipartite graph yields the SDR for the higher order path. This process is summarized in Drawing 7. In Drawing 7, we can see an example second-order path group $(e_1$-$\{1,2\}$-$e_2$-$\{1,2,4\}$-$e_3)$ that is extracted from the co-occurrence graph $G_c$. This particular $2^{nd}$ order path group includes two sets of records: $S_1=\{1,2\}$ and $S_2=\{1,2,4\}$. $S_1$ corresponds to the records in which $e_1$ and $e_2$ co-occur, and $S_2$ is the set of records in which $e_2$ and $e_3$ co-occur. A bipartite graph $G_b=(V_1 \cup V_2, E)$ is formed where $V_1$ is the two sets of records and $V_2$ is the all records in these sets. Enumerating all maximum matchings in this graph yields all higher-order paths in the path group. The fourth diagram (depicted in Drawing 7) shows an example of one of the many paths in this path group. In this higher-order path, edge labels $R_1$ and $R_4$ are records in $S_1$ and $S_2$ and the path corresponds to the orange-colored maximum matching in the bipartite graph.

In lieu of enumerating all maximum matchings to find the SDRs, in prior work [16] we also developed the following closed-forms for enumerating second- and third-order paths in path groups based on the inclusion-exclusion [24] principle:

$$N_{-2}=|A||B|-|A \cap B| \tag{10}$$

$$N_{-3}=|A||B||C|-(|A \cap B||C|+|A \cap C||B|+|B \cap C||A|)+ 2|A \cap B \cap C| \tag{11}$$

$$\begin{aligned}N_{-4}=&|A||B||C||D|-(|A \cap B||C||D|+|A \cap C||B||D|+\\&|A \cap D||B||C|+|B \cap C||A||D|+|B \cap D||A||C|+\\&|C \cap D||A||B|)+(|A \cap B||C \cap D|+|A \cap C||B \cap D|+\\&|A \cap D||B \cap C|)+2(|A \cap B \cap C||D|+|A \cap B \cap D||C|+\\&|A \cap C \cap D||B|+|B \cap C \cap D||A|)-6(|A \cap B \cap C \cap D|)\end{aligned} \tag{12}$$

Here the letters A, B and C represent sets of records for each edge in a third-order path group (e.g., $e_1$-$\{2,3,4\}$-$e_2$-$\{1,3,5\}$-$e_3$-$\{2,3,5\}$-$e_4$, $A=\{2,3,4\}$, $B=\{1,3,5\}$, $C=\{2,3,5\}$). Although our application is not completely analogous to the enumeration of sets using the inclusion-exclusion principle, we were able to successfully develop these three closed-forms using inclusion-exclusion as a starting point. For orders higher than four we rely on our iterative approach to enumeration using bipartite graphs.

This approach, known as "Higher-order Naïve Bayes", has been shown to significantly improve the classification performance when the training set is small. Therefore this algorithm is ideal for producing an accurate topic-indexing system while keeping the amount of manual classification required by the user to a minimum.

The output of the categorization algorithm is an index that is partitioned into subsections called 'topic indexes', with one topic index containing all entries that correspond to a particular topic. As data is added to each topic index, a 'lift' metric is computed to measure the density and quality of data in the topic index. The data in the topic indexes facilitate the advanced searching and recommendation features of the system.

[004 Description of Peer-to-Peer Software and Protocol]

Peer-to-peer (P2P) technology refers to a system that manages distributed resources to perform data sharing functions in a decentralized manner. The invention contains a customized software implementation of a peer-to-peer protocol that serves to automatically share the contents of the hard disk on a network to which other instances of the invention (or compatible devices) are connected. The peer-to-peer software is also customized to share the index data generated by the indexing software component. Through the peer-to-peer software component, the invention acts as one node, or peer, on a large network of compatible devices.

The peer-to-peer component works by first registering the device on the network with a unique generated ID number. It contacts a server peer [28] and registers its ID with a username and password supplied by the user of the system. If the authentication process succeeds, the client will be able to continue by requesting the IDs of peers that are in the same group.

The peer-to-peer software performs authentication and access control by means of user groups. The groups in the peer-to-peer network form a hierarchical structure. At the lowest level, a group is created for each individual user who is registered in the system. This provides each user full search, read, and write access for his or her own data from any remote location. At the next level there are "user groups" which are created by users and can be joined by an arbitrary number of other users. Such groups may have open membership (anyone who desires may join), or invitation-only, by means of a digital certificate. A single user may be a member of any number of such groups. By default, these groups offer read-only data access to the members of the group. At the highest level there is the "world" group, consisting of all users of the system on any reachable network.

The underlying mechanics of the peer-to-peer protocol perform discovery and routing functions that allow any type of data to be distributed between peers on the network without recourse to a centralized server. The peer-to-peer software incorporates advanced techniques for providing access to networked resources which are located behind firewalls or Network Address Translation (NAT) routers.

The peer-to-peer software contains additional capabilities allowing the device to act as a "Server Peer" on the network. This added functionality is related to data transport, discovery and routing on the peer-to-peer network. Server peers increase the reliability flexibility, and self-healing properties of the peer-to-peer network. The server peer functionality may be optionally activated by the end user.

[005 Network Protocols Module]

This component comprises an implementation of the lower-level set of networking protocols that allow the messages generated by the P2P protocol to be assembled into packets and transmitted across a computer network. In the preferred embodiment, the network protocols are embodied in hardware on an ASIC or set of ASICs.

[006 Indexing Module to File System Interface]

The hard disk is formatted so as to provide a separate partition for the index data. The indexing software runs continuously, monitoring the data that is written to the hard disk, and updating the topic indexes on disk dynamically. In the preferred embodiment, the indexing software runs on the coprocessor inside the invention's housing, for as long as the system is powered on. In this way, the indexing software works transparently in conjunction with the normal file system operations, providing a more sophisticated form of data access in real time. The union of a transaction-based file system with automatic indexing software represents a significant advance in the ease of use and performance of data sharing systems.

[007 Peer-to-Peer (P2P) Module to File System Module Interface]

The security model in the peer-to-peer software is closely coupled to the ACL security model of the file system. The single-user group in the P2P software corresponds to an individual user name in the file system, the user groups correspond to file system groups, and the world group corresponds to the world access classification in the file system.

This improves security by eliminating "gaps" and "leaky abstractions" in the authentication and access model. The union of group-based authentication in the P2P software module with group-based ACL's in the file system overcomes deficiencies in the prior art related to the cohesiveness, complexity, and security of data sharing.

[008 Indexing Module to Peer-to-Peer Module Interface]

The peer-to-peer software component is integrated with the indexing component in a novel way. The most significant feature of the integration of the peer-to-peer software with indexing is index sharing. Indexes containing data classified under a single topic (topic indexes) are shared transparently on the network, according to the demands of end-user applications and the permissions that users specify for their topic indexes. The permissions of each topic index can be set independently of the data itself and independently of other topic indexes. The user of the system can select which of their topic indexes are shared with which groups. In this way the user chooses by topic which subsets of their data are shared, rather than by file location as is typical in file-sharing applications.

Furthermore, the peer-to-peer software is designed to treat index data that is transferred over the network differently from other types of data. Each of the "packets" (transmission units) of data transferred by the peer-to-peer protocol contain a predefined set of signature bytes that identify them as either index data or regular data. If a peer node that is used to transfer data between two other hosts sees index data in the packets it is transferring, and it has permission to read the index, it will add that index data to its own index even though the node is not the original destination for the index data. In this way the distributed index of the P2P group's data becomes more complete as the network is utilized.

The sharing of topic indexes provides an efficient peer search method, in which all resources shared by a group can be searched. When the user performs a search of a group to which he or she has search access, the indexes of that group are downloaded to the user transparently through the peer-to-peer network. This is much more efficient and robust than attempting to discover and search all shared data on the network, or than maintaining a centralized index.

Through this the system automatically provides searching and recommendation of the shared data on the basis of content topics, which is a more advanced and intuitive method of sharing data. Searching is just one sample application that is provided by means of topic index sharing; others are detailed in [29], [30].

[009 Peer-to-Peer Module to Network Protocol Module Interface]

The Peer-to-Peer module forwards its messages to the network protocol module, enabling the network module to send its peer-to-peer messages to remote peer-to-peer modules transparently. The network module also decodes messages received from remote peer-to-peer modules and forwards them to the peer-to-peer module.

[010 Graphical User Interface]

The Graphical User Interface software is the primary means of operating the invention. Upon installation of the device, the user interface allows the user to register their device with a specific username, join various pre-existing groups, select which topic indexes are shared with which groups, to browse the files on their own devices remotely, and to search by topic or metadata on any peers to which the user has access.

This describes a minimal set of the functionality that is provided by any user interface to the invention. The invention facilitates the provision of a large number of user services, some of which are further described in patent applications [28] and [30]. The advanced data sharing capabilities of the invention allow for an unlimited variety of innovative services to be provided by various user interfaces and network configurations.

[011 HTTP Server]

In the preferred embodiment the invention also contains a firmware IP stack and HTTP server. This allows a web-based graphical user interface, as described above, to be provided to any client device on the network to which the invention is connected. This allows a high level of the invention's functionality to be accessed with no software installation necessary on a client device. This should be considered an optional component and not key to the originality or usefulness of the invention.

[012 P2P (Peer-to-Peer) Backup Application Software]

The system also contains software which performs automated backups of data shared in the P2P network to which it is attached. The backup functionality is a use case of the P2P network's provided functionality, and so the backup software should be considered to reside at the application level.

Any indexed shared data can be tagged for backup. A user can set backup tags for his or her data by folder, by index topic, or by individual file. This tag becomes part of the index of the user's data. When the backup software is run, it retrieves all indexes in the network group and searches the index for all files tagged for backup. All tagged files are downloaded from the network and stored in a special backup archive on the hard drive. The backup archive preserves the device ID and the directory location of each backup file so that a complete restoration can be performed.

DESCRIPTION AND OPERATION OF ALTERNATIVE EMBODIMENTS

1. All-software embodiment
In this embodiment, there is no specialized hardware at all. The indexing, P2P, and User interface software modules all run on a host device such as a PC.
2. Only indexing is in hardware, and P2P and the user interface run on a host device. This embodiment has fewer components of the system in hardware or firmware than the preferred embodiment; only the indexing module runs on the embedded platform. This provides many of the performance advantages of the preferred embodiment, as the indexing is the software function that is most closely wedded to the file system and storage hardware.
3. All on One Chip
In this embodiment, a specialized dedicated ASIC is used to embody all the software functions of the system on a single chip.

While the above descriptions contain many specificities, these should not be construed as limitations on the scope of the invention, but rather as an exemplification of one preferred embodiment thereof. Many other variations are possible, and in particular the scope of the invention is not limited by, for example, the type of data storage technology used, the size, configuration or materials of any casings or enclosures, or the hardware platform or operating system on which the software is run. Accordingly, the scope of the invention should be determined not by the embodiments illustrated, but by the appended claims and their legal equivalents.

OPERATION OF INVENTION

Preferred Embodiment

In the preferred embodiment, the device is first plugged into a power outlet, it is connected to a network by an Ethernet cable, and the power is switched on. At this point the device automatically acquires an IP address using DHCP.

Then the user uses a personal computer with a web browser to visit the web page provided by the device's web server. Using the web page interface, the user creates a username and password and specifies sharing permissions for the device.

At a later date, the user can visit the web page interface, log in using the previously created username and password, and examine a summary of the index data created by the device, and alter the sharing permissions for a given topic.

Drawing 6 contains a flowchart of the indexing process, by which data to be written to the disk is analyzed and indexed. This is an automatic operation.

REFERENCES

[1] B. Taskar, P. Abbeel, D. Koller, Discriminative Probabilistic Models for Relational Data, In Proceedings of Uncertainty in Artificial Intelligence conference UAI02, Edmonton, Canada, 2002

[2] L. Getoor and C. P. Diehl, Link Mining: A Survey. SIGKDD Explorations, 7(2), 2005, 3-12

[3] S. A. Macskassy and F. Provost, A brief survey of machine learning methods for classification in networked data and application to suspicion scoring, Workshop on Statistical Network Analysis at 23rd International Conference on Machine Learning, Pittsburgh, Pa., 2006

[4] R. Angelova and G. Weikum, Graph-based Text Classification: Learn From Your Neighbors, SIGIR'06, August, 2006, Seattle, USA

[5] S. Chakrabarti, B. Dom, P. Indyk, Enhanced Hypertext Classification Using Hyper-Links, In Proceedings of ACM SIGMOD Conference, 1998, pp. 307-318

[6] J. Neville and D. Jensen, Iterative Classification in Relational Data. In Proc. AAAI-2000 Workshop on Learning Statistical Models from Relational Data, 2000, pp. 13-20

[7] B. Taskar, E. Segal, D. Koller, Probabilistic Classification and Clustering in Relational Data. In Proc. 17th Intenabonal Joint Conference on Artificial Intelligence, 2001, pp. 870-878, 2001.

[8] Q. Lu, and L. Getoor, Link-based Classification. Proceedings of the Twentieth international conference on machine learning (ICML-2003), Washington D.C., 2003

[9] J. Neville and D. Jensen, Dependency Networks for Relational Data, Proceedings of the Fourth IEEE International Conference on Data Mining (ICDM'04), November 2004, pp. 170-177, Brighton, UK

[10] J. D. M. Rennie, L. Shih, J. Teevan, D. R. Karger, Tackling the poor assumptions of naive bayes text classifiers, In Proceedings of the Twentieth International Conference on Machine Learning, 2003.

[11] A. K. McCallum and K. Nigam. A comparison of event models for naive bayes text classification. In Working Notes of the ICML/AAAI Workshop on Learning for Text Categorization, 1998

[12] S. Eyheramendy, D. D. Lewis, D. Madigan, On the naive Bayes model for text categorization. In Proceedings of AISTATS 2003, 9th International Workshop on Artificial Intelligence and Statistics, 2003

[13] S. Chakrabarti. Mining the Web: Discovering Knowledge from Hypertext Data. Morgan Kaufmann, 2002.

[14] A. Kontostathis, and W. M. Pottenger, A Framework for Understanding LSI Performance. Information Processing & Management, 42(1), 2006, pp. 56-73.

[15] S. Deerwester, S. T. Dumais, G. W. Furnas, T. K. Landauer, R. Harshman, Indexing by latent semantic analysis. Journal of the American Society for Information Science, vol. 41, no. 6, 1990, pp. 391-407.

[16] M. Ganiz, W. M. Poftenger, X. Yang, Link Analysis of Higher-Order Paths in Supervised Learning Datasets, In the Proceedings of the Workshop on Link Analysis, Counterterrorism and Security, 2006 SIAM Conference on Data Mining, Bethesda, Md., April 2006

[17] M. Ganiz, W. M. Poftenger, S. Kanitkar, M. C. Chuah, Detection of Interdomain Routing Anomalies Based on Higher-Order Path Analysis. Proceedings of the Sixth IEEE International Conference on Data Mining (ICDM'06), December 2006, Hong Kong, China

[18] P. Edmonds, Choosing the word most typical in context using a lexical co-occurrence network. In Proceedings of the Thirty-fifth Annual Meeting of the Association for Computational Linguistics, 1997, pp. 507-509.

[19] X. Zhang, M. Berry, P. Raghavan, Level search schemes for information filtering and retrieval. Information Processing and Management 37 (2), 2000, pp. 313-334.

[20] H. Schütze, Automatic Word Sense Discrimination. Computational Linguistics 24 (1), 1998, pp. 97-124.

[21] J. Xu, W. B. Croft, Corpus-Based Stemming Using Co-Occurrence of Word Variants. ACM Transactions on Information Systems, 16 (1), 1998, pp. 61-81.

[22] T. Uno, An Output Linear Time Algorithm for Enumerating Chordless Cycles, 92nd SIGAL of Information Processing Society Japan, 2003, pp. 47-53

[23] T. Uno, Algorithms for Enumerating All Perfect, Maximum and Maximal Matchings in Bipartite Graphs. Lecture Notes in Computer Science, Vol. 1350. Proceedings of the 8th International Symposium on Algorithms and Computation, 1997, pp. 92-101, ISBN: 3-540-63890-3, Springer-Verlag, London, UK

[24] J. H. Van Lint, and R. M. Wilson. A Course in Combinatorics. Cambridge University Press, 1993, ISBN: 0-521-42260-4

[25] A. McCallum, K. Nigam, J. Rennie, K. Seymore, Automating the construction of internet portals with machine learning. Information Retrieval, 3, 2000, pp. 127-163.

[26] C. L. Giles, K. Bollacker, S. Lawrence, CiteSeer: An automatic citation indexing system, ACM Digital Libraries 98, 1998

[27] P. Sen, and L. Getoor, Link-based Classification. University of Maryland Technical Report, Number CS-TR-4858, February 2007

[28] Intuidex Inc., "Peer-to-Peer Indexing-Based Marketplace", provisional patent 61/008,405 filed Dec. 20, 2007.

[29] Intuidex Inc., "System for Content-Based Peer-to-Peer Indexing of Data on a Networked Storage Device", provisional patent 61/008,404 filed Dec. 20, 2007.

[30] Intuidex Inc., "Social Networking on a Website with Topic-Based Data Sharing", provisional patent 61/008,399 filed Dec. 20, 2007.

What is claimed is:

1. A computing device comprising:
(a) a processor;
(b) a data storage device for tangibly storing program logic for execution by the processor, the program logic comprising:
a file system executed by the processor for performing one or more of reading, writing, and controlling access to data on the data storage device;
a network protocol suite executed by the processor for sending the data over a network;
a higher-order indexing system executed by the processor for generating a plurality of topic indexes from a pre-selected data set, wherein higher-order indexing is based on relationships between information in the pre-selected data set, wherein each topic index comprises a plurality of key elements, a plurality of entry items that link the plurality of key elements to the data, and a topic classifier for the data;
a peer-to-peer networking system executed by the processor for transmitting the topic indexes over the network;
an interconnection between the higher-order indexing system and the file system to automatically generate topic indexes of data as data is written to the data storage device;
an interconnection between the higher-order indexing system and the peer-to-peer networking system to provide the topic indexes to the peer-to-peer networking system for sharing the topic indexes on the network; and
an interconnection between the peer-to-peer networking system and the network protocol suite for translating peer-to-peer messages into data packets suitable for transmission through the network, thereby enabling the storing, indexing, and sharing of data by topic on the network,
wherein the higher-order indexing system further calculates a probability that a vector d belongs to class C using:

$$P(C|d)=P(d|C)P(C), \text{ and}$$

wherein the higher-order indexing system calculates probabilities: $P(t|C)=$(# of higher-order paths in class C comprising entity t)/(# of higher-order paths in class C) and $P(C)=$(# of higher-order paths in class C)/(total # of higher-order paths), and wherein the higher-order indexing module defines higher-order paths using a non-empty graph $G=(V,E)$ of the form $V=\{x_0, x_1, \ldots, x_k\}$ $E=\{(x_0,x_1,x_2,\ldots,x_{k-1}x_k\}$ with nodes $x_i$ distinct, two vertices $x_i$ and $x_k$ linked by path P where the number of edges in P is its length, where vertices $V=\{e_0,e_1,\ldots,e_k\}$ represent entities, and edges $E=\{r_0, r_1, \ldots, r_m\}$ represent records, documents, vectors or instances, and wherein both vertices and edges are distinct.

2. The computing device of claim 1 wherein the network protocol suite comprises a plurality of ASICs mounted on a printed circuit board.

3. The computing device of claim 2 wherein the printed circuit board and the ASICs are mounted inside a housing separate from a computer's case, with an external network connector.

4. The computing device of claim 1 wherein the file system is further for performing one or more of reading, writing, and access control for metadata on the data storage device.

5. The computing device of claim 1 wherein the file system provides group-level security through access control lists.

6. The computing device of claim 1 wherein each topic in the topic index is a classification of contents of the data within a range of a pre-existing set of topic categories.

7. The computing device of claim 6 wherein the higher-order indexing system is further configured to generate a classification rule from a training set for automatically classifying received data.

8. A computer readable storage medium tangibly storing computer instructions executed by a computing device, the instructions comprising the steps of:
performing one or more of reading, writing, and controlling access to data stored on a data storage device;
generating, via a higher order indexing system, a plurality of topic indexes from a pre-selected data set, wherein higher-order indexing is based on relationships between information in the pre-selected data set, wherein each topic index comprises a plurality of key elements, a plurality of entry items that link the plurality of key elements to the data, and a topic classifier for the data;
transmitting the topic indexes over the network;
automatically generating topic indexes of data as data is written to the data storage device;
sharing the topic indexes on the network; and
translating peer-to-peer messages into data packets suitable for transmission through the network, thereby enabling the storing, indexing, and sharing of data by topic on the network, wherein
the generating of the topic indexes further comprises calculating a probability that a vector d belongs to class C using:
$P(C|d)=P(d|C)P(C)$, and wherein the generating of the topic indexes further comprises calculating probabilities:
$P(t|C)=$(# of higher-order paths in class C comprising entity t)/(# of higher-order paths in class C) and P(C)=(# of higher-order paths in class C)/(total # of higher-order paths), wherein the higher-order paths are defined using a non-empty graph G=(V,E) of the form V={$x_0, x_1, \ldots, x_k$}, E={$(x_0, x_1, x_2, \ldots, x_{k-1}x_k)$} with nodes $x_i$ distinct, two vertices $x_i$ and $x_k$ linked by path P where the number of edges in P is its length, where vertices V={$e_0, e_1, \ldots, e_k$} represent entities, and edges E={$r_0, r_1, \ldots, r_m$} represent records, documents, vectors, or instances, and wherein both vertices and edges are distinct.

9. The computer readable storage medium of claim 8 wherein each topic in the topic index is a classification of contents of the data within a range of a pre-existing set of topic categories.

10. The computer readable storage medium of claim 8 wherein the generating of the topic indexes further comprises classifying data into a topic index based on relationships between information in the pre-selected data set.

11. The computer readable storage medium of claim 8, further comprising storing in the data storage device data stored on different devices and relevant to a particular topic index regardless of which devices the data was originally stored.

12. The computer readable storage medium of claim 11 further comprising receiving a request to store data relevant to the particular topic on the data storage device.

13. The computer readable storage medium of claim 8 further comprising extracting higher-order paths from a co-occurrence graph.

* * * * *